United States Patent Office 3,482,926
Patented Dec. 9, 1969

3,482,926
HALOGENATING FIBERS COMPOSED OF MIXTURES OF POLYPROPYLENE AND A BASIC NITROGEN CONTAINING POLYMER
Vittorio Cappuccio, Terni, Italy, assignor to Montecatini Edison S.p.A., Milan, Italy
No Drawing. Continuation-in-part of application Ser. No. 188,982, Apr. 20, 1962. This application June 14, 1966, Ser. No. 557,374
Claims priority, application Italy, Apr. 24, 1961, 7,657/61, Patent 649,762
Int. Cl. D06m 11/00
U.S. Cl. 8—115.5    9 Claims

ABSTRACT OF THE DISCLOSURE

Improving tinctorial characteristics of synthetic fiber comprising isotactic polypropylene and from about 1–25% by weight of a polymeric basic nitrogen compound as tinctorial modifier by contacting the fiber at a temperature up to about 150° with a member selected from the group consisting of gaseous halogens, liquid halogens, aqueous solutions of halogens and organic solutions of halogens containing 0.1 to 25% by weight of the halogen dissolved therein.

---

This application is a continuation-in-part of copending application Ser. No. 188,982, filed Apr. 20, 1962, now abandoned.

The present invention relates to a process for improving the tinctorial characteristics of fibers obtained by spinning mixes containing crystalline olefin polymers, consisting prevailingly of isotactic macromolecules prepared by low pressure polymerization, and basic nitrogen compounds.

In prior patent applications there have been described processes for rendering more dye receptive the fibers obtained by extrusion of mixes containing certain crystalline polyolefins and basic nitrogen compounds. These processes, in general, comprise subjecting the fibers to the action of diepoxy compounds, such as ethylenglycol diglycidylether, 4,4'-dihydroxy-diphenyldimethyl methane and diepoxy butane, alkaline oxides, diisocyanates, formaldehyde, cross-linking monomers, e.g., divinyl benzene, divinylacetylene, and the like.

Other prior proposals which have been made for improving the dye receptively of polyolefins and polyolefin fibers include treatments with sulfonating or chlorosulfonating agents and treatments with phosgene. There has also been a proposal to treat polyethylene structures with halogens in order to promote adhesion thereto of printing inks. However, none of these latter proposals are concerned with treating fibers comprising polyolefins and basic nitrogen compounds.

It has now been surprisingly found that a specific treatment of textile fibers comprising (1) crystalline polyolefins consisting prevailingly of isotactic macromolecules prepared with stereospecific catalysts and modified by the addition of (2) a basic nitrogen-containing compound makes it possible to improve the tinctorial characteristics of the fibers.

The treatment of the present invention is particularly suitable for yarns obtained from a polyolefin such as polypropylene and containing tinctorial modifiers such as basic nitrogen compounds having a polymeric character, such as polyvinylpyridines prepared with stereospecific catalysts and basic epichlorohydrin condensates.

In acordance with the present invention there is provided a process for increasing the tinctorial characteristics of fibers and the like obtained from compositions containing a crystalline polyolefin consisting prevailingly of isotatic macromolecules and a basic nitrogen containing compound, which process comprises exposing the fibers at temperatures between room temperature and 150° C., preferably between room temperature and 80° C., to the action of halogens (chlorine, fluorine, bromine and iodine), preferably chlorine, either in the gaseous or liquid state. The fibers may also be treated by being immersed in aqueous or organic solutions containing the halogen dissolved therein, employing halogen concentrations in the solvent varying from 0.1 to 25% by weight, preferably from 1 to 10%, for times varying from several seconds (e.g., 2 seconds) to 2 to 3 hours. Acetic acid, acetic anhydride, carbon tetrachloride, ethylenedibromide, $SiCl^4$, pentafluoroheptane and the like may be used as solvents for the above organic solutions. The treatment with gaseous chlorine is preferably carried out at room temperature.

The present invention also provides fibrous materials and the like having improved tinctorial properties, which have been obtained in acordance with the foregoing process.

The halogenation of the fibers can be carried out with the aid of light radiation (visible or ultraviolet) which catalyzes the halogenation reaction. It is also possible to carry out the reaction in the presence of substances which have a swelling action on the fibers, such as perchloroethylene, the various petroleum fractions, cetyl alcohol, chlorinated organic compounds and the like.

The extruded fibers may be stretched using stretching ratios of between 1:2 and 1:10 at suitable temperatures such as those between 80° and 150° C., using a suitable streching device which may be heated with hot air, steam or a similar fluid or a heated plate.

The treatment with the halogens according to the invention may be carried out before and/or after the stretching of the fibers.

This halogen treatment of fibers containing polymeric nitrogen compounds as tinctorial modifiers particularly improves the dye receptivity (with respect to e.g., acid dyes, metallized dyes, chrome dyes, vat dyes, plastosoluble (dispersed) dyes) of the fibers. The dye fastness of the fibers is also substantially improved.

The treatment according to the invention can be applied to fibers made up essentially of (1) crystalline polyolefins consisting prevailingly of isotactic macromolecules prepared with stereospecific catalysts (see, for example, Italian Patent 526,101), and (2) basic nitrogen compounds, such as crystalline polyvinylpyridines (prepared according to U.S. patent applications Ser. No. 46,344 now U.S. Patent 3,153,680 and Ser. No. 46,391, now U.S. Patent 3,115,478), basic epichlorohydrin condensation products (prepared according to U.S. patent applications Ser. No. 30,732, now abandoned, and Ser. No. 124,346), now abandoned, dihaloderivatives/diamine condensation products (prepared according to U.S. patent application Ser. No. 83,141, now U.S. Patent 3,098,697), polyimines, either alkylated or unalkylated (prepared according to Italian Patent No. 587,008) and the like. Such basic nitrogen compounds include crystalline vinylpyridine polymers such as poly-2-vinylpyridine, poly-4-vinylpyridine and poly-2-methyl-5-vinylpyridine, condensation products of primary aliphatic amines with epichlorohydrin and piperazine, and polyimines obtained by the condensation of halogen derivatives with diamines.

The mix, if so desired, may also contain a suitable solid dispersing agent for the basic nitrogen compound in a suitable amount such as from about 1–5% by weight of the total mix. Suitable agents are: cetyl alcohol, stearyl alcohol, stearic acid, terephthalic acid, benzoin, furoin, vinyl stearate, mono-, di- and tristearic esters of glycerol, monoethanolamine stearate, stearamine, N-diethanol-lauramide, $C_6$ to $C_{30}$ aliphatic amines, condensation products of ethylene oxide with alcohols, amines and phenols; polystearamide, polyacrylic acid, polystyrene, styrene copolymers and terpene polymers.

The following examples are presented to further illustrate the present invention and are not intended to limit its scope. Unless otherwise indicated, all parts and proportions are by weight. In the examples, the intrinsic viscosity $[\eta]$ of polypropylene is determined in heptane at 135° C., while the intrinsic viscosity of polyvinylpyridine is measured in dimethylformamide at 30° C.

As is known to the art subsequent to the discoveries of Natta et al., the presence of a heptane residue in the polypropylene of the following working examples is an indication of the presence of isotactic macromolecules therein. Thus, the polypropylene used in these specific embodiments, as indicated by its heptane residue, consists prevailingly (more than 50%) or essentially of isotactic macromolecules.

EXAMPLE 1

A mix was prepared at room temperature in a Henschel-type mixer from:

| | Kg. |
|---|---|
| Polypropylene | 9.500 |
| Polyvinylpyridine | 0.500 |

The characteristics of the polypropylene were as follows:

$[\eta] = 1.46$
ash content=0.04%,
residue after heptane extraction=95.2%.

The characteristics of the poly-2-vinyl-pyridine were as follows:

$[\eta] = 0.35$,
melting point=189° C.

The mix was granulated and then extruded in a melt spinning device under the following conditions:

| | ° C. |
|---|---|
| Screw temperature | 195 |
| Spinning head temperature | 205 |
| Spinneret temperature | 205 |

Spinneret with 60 holes, each with a diameter of 0.8 mm. and a length of 16 mm.:

| | | |
|---|---|---|
| Maximum pressure | kg./cm.² | 55 |
| Winding speed | m./min. | 380 |

The fiber was stretched in a steam-heated device, at a temperature of 130° C., with a stretching ratio of 1:5.3. It was then subjected to a dimensional stabilization treatment, under free shrinking conditions, at 105° C. for 60 minutes, as more fully described in Italian Patent No. 566,914.

The serimetric characteristics of the stretched and heat stabilized fiber were as follows:

| | | |
|---|---|---|
| Tenacity | g./den | 4.3 |
| Elongation | percent | 25 |

The fibers were then crimped and cut into a staple having a length of 9 cm.

The staple thus obtained was immersed for 30 minutes at 25° C. in an aqueous solution saturated with chlorine, employing a fiber bath ratio of 1:40. After centrifuging, it was washed with water and dried.

In this and in the following examples the staple thus treated was subjected to dyeing with the following dyes:

Alizarine yellow 2 G (C.I. No. 1407, mordant yellow 1) (acid)
Wool red B (C.I. No. 1142, acid red 115) (acid)
Alizarine red S (C.I. No. 1452, mordant red 3) (acid)
Alizarine blue SE (C.I. No. 1248, acid blue 43) (acid)
Acid black IVS (C.I. No. 1375), acid black 1) (acid)
Lanasyn yellow GLN (C.I. No. 1049, acid yellow 112) (metallized)
Lanasyn red 2 GL (C.I. No. 1182, acid red 216) (metallized)
Lanasyn brown 3 RL (C.I. No. 1340, acid brown 30) (metallized)
Setacyl yellow 3 G (C.I. No. 1667, disperse yellow 20) (plastosoluble)
Cibacet scarlet BR (C.I. No. 2573, disperse red 18) (plastosoluble)
Brilliant setacyl blue BG (C.I. No. 1714, disperse blue 3) (plastosoluble)

Dyeing was carried out for one and one-half hours at the boiling point of the bath, in baths containing 2.5% of the dye (calculated on the weight of the fiber) with a fiber/bath ratio of 1:40.

Dyeing with acid and metallized dyes was carried out in the presence of 3% of ammonium acetate (by weight of the fiber) and of 1% of a surface-active agent consisting of the condensation product of ethylene oxide with an alkyl phenol. After boiling for 30 minutes, 0.2% (by weight of the fiber) of glacial acetic acid was added in order to improve the rate of dye utilization.

Dyeing with plastosoluble (dispersed) dyes was carried out in the presence of 2% of a suitable surface-active agent (by weight of the fiber), such as "Ethyl-laurol."

The yarns, after dyeing, were rinsed with running water and appeared to be intensely dyed in all cases. The fastness to light, washing and rubbing was found to be completely satisfactory.

EXAMPLE 2

A mix was prepared at room temperature in a Henschel-type mixer from:

polypropylene—9.500 kg.
octadecylamine (0.3 moles)-epichlorohydrin (1.3 moles)—piperazine (1 mole) condensate—0.500 kg.

The characteristics of the polypropylene were as follows:

$[\eta] = 1.46$,
ash content=0.04%,
residue after heptane extraction=95.2%.

The mix was granulated and then extruded in a melt spinning device under the following conditions:

| | ° C. |
|---|---|
| Screw temperature | 195 |
| Spinning head temperature | 200 |
| Spinneret temperature | 205 |

Spinneret type: 60/0.8 x 16 mm. (60 holes, diameter=0.8 mm., length=16 mm.):

| | | |
|---|---|---|
| Maximum pressure | kg./cm.² | 55 |
| Winding speed | m./min. | 380 |

The fiber was stretched in a steam-heated device, at a temperature of 130° C., with a stretching ratio of 1:5.3. It was then subjected to a dimensional stabilization treatment, under free-shrinking conditions, at 105° C. for 60 minutes.

The serimetric characteristics of the stretched and heat stabilized fiber were as follows:

| | | |
|---|---|---|
| Tenacity | g./den | 4.7 |
| Elongation | percent | 23.8 |

The fibers were then crimped and cut into a staple having a length of 9 cm.

The staple thus obtained was immersed for 30 minutes at 25° C. in an aqueous solution saturated with chlorine, with a fiber/bath ratio of 1:40, and, after centrifuging, was washed with water and dried.

Upon dyeing this staple with the dyes mentioned in Example 1, intense solid colors were obtained.

EXAMPLE 3

A mix was prepared at room temperature in a Henschel-type mixer from:

polypropylene—9.500 kg.
dichloroethane (1 mole-hexamethylendiamine (1.33 mols) condensate, alkylated with lauryl chloride (0.25 mols)—0.500 kg.

The characteristics of the polypropylene used were as follows:

$[\eta]=1.46$,
ash content=0.04%,
residue after heptane extraction=95.2%.

The mix was granulated and then extruded in a melt-spinning device under the following conditions:

| | |
|---|---|
| Screw temperature °C | 195 |
| Spinning head temperature °C | 205 |
| Spinneret temperature °C | 205 |
| Spinneret type | 60/0.8 x 16 mm. |
| Maximum pressure kg./cm.² | 57 |
| Winding speed m./min | 380 |

The fiber was stretched in a steam-heated device, at a temperature of 130° C., with a stretching ratio of 1:5.3. It was then subjected to a dimensional stabilization treatment, under free-shrinking conditions at 105° C. for 60 minutes.

The serimetric characteristics of the stretched and heat stabilized fiber were as follows:

| | |
|---|---|
| Tenacity g./den | 4.5 |
| Elongation percent | 25 |

The fibers were then crimped and cut into a staple having a length of 9 cm.

The staple thus obtained was immersed for 30 minutes at 25° C. in an aqueous solution saturated with chlorine, with a fiber/bath ratio of 1:40, and, after centrifuging, was washed with water and dried.

Upon dyeing this staple using the dyes of Example 1, intense solid colors were obtained.

EXAMPLE 4

50 g. of the staple prepared as described in Example 1 were introduced into a 1-liter flask containing 500 cc. of water at 25° C. Chlorine was bubbled therethrough for 30 minutes. The chlorine current was then stopped and the staple removed from the flask, washed and dried.

Upon dyeing the staple thus treated with the dyes of Example 1, intense solid colors were obtained.

EXAMPLE 5

50 g. of staple prepared as described in Example 2 were placed in a 1-liter flask containing 500 cc. of water at 25° C. Chlorine was bubbled through the liquid for 30 minutes. The chlorine current was then stopped and the staple removed from the flask, washed and dried.

Upon dyeing the staple thus treated with the dyes of Example 1, intense solid colors were obtained.

In addition to fibers obtained from polypropylene consisting prevailingly of isotactic macromolecules, as specifically exemplified above, fibers obtained from other alpha-olefin polymers are suitable for treatment in accordance with the present invention. Polymers of alpha-olefins of the formula $CH_2=CHR$, wherein R is a hydrocarbon radical, such as butene, pentene, methylpentene, hexene, heptene, styrene, etc. may thus be employed.

These polymers are obtained using suitable stereospecific catalysts such as those of Natta et al.

Many variations and modifications can, of course, be practiced without departing from the scope and spirit of the present invention.

Having thus described the present invention, what it is desired to secure and claim by Letters Patent is:

1. A process for improving the tinctorial characteristics of a fiber obtained by the extrusion and stretching of a mixture containing (1) polypropylene consisting prevailingly of isotactic macromolecules and (2) from about 1 to 25% by weight of a polymeric basic nitrogen compound selected from the group consisting of crystalline polymeric vinyl pyridines, condensation products of primary aliphatic amines, epichlorohydrin and piperazine, and polyimines obtained by the condensation of halogenated hydrocarbons with diamines, which process consists essentially of contacting the fiber at a temperature from about room temperature to 150° C. with a member selected from the group consisting of gaseous halogens, liquid halogens, solutions of halogens in water and solutions of halogens in inert organic solvents, said solutions containing 0.1 to 25% by weight of the halogen dissolved therein.

2. The process of claim 1 wherein said contact with the halogen is carried out at temperatures between room temperature and 80° C., and said halogen solutions contain a concentration of halogen in the solvent of from 0.1 to 10% by weight.

3. The process of claim 1 wherein said fiber is contacted with an aqueous solution of a halogen.

4. The process of claim 1 wherein chlorine is used as the halogen.

5. The process of claim 1 wherein said basic nitrogen compound is the condensation product of 0.3 mole of octadecylamine, 1.3 moles of epichlorohydrin and 1 mole of piperazine.

6. The process of claim 1 wherein said basic nitrogen compound is poly-2-vinylpyridine.

7. The process of claim 1 wherein said basic nitrogen compound is poly-4-vinylpyridine.

8. The process of claim 1 wherein said basic nitrogen compound is poly-2-methyl-5-vinylpyridine.

9. A fiber having improved tinctorial characteristics, said fiber comprising a mixture containing (1) polypropylene consisting prevailingly of isotactic macromolecules and (2) from about 1 to 25% by weight of a polymeric basic nitrogen compound selected from the group consisting of crystalline polymeric vinyl pyridines, condensation products of primary aliphatic amines, epichlorohydrin and piperazine, and polyimines obtained by the condensation of halogenated hydrocarbons with diamines, which fiber has been treated by the process of claim 1.

References Cited

UNITED STATES PATENTS

| 3,112,981 | 12/1963 | Fuortes et al. | 8—4 |
| 2,801,447 | 8/1957 | Wolmski. | |
| 3,099,515 | 7/1963 | Goodings et al. | |
| 3,228,744 | 1/1966 | Karn. | |
| 3,230,029 | 1/1966 | Cappuccio et al. | |

FOREIGN PATENTS

| 811,848 | 4/1959 | Great Britain. |

GEORGE F. LESMES, Primary Examiner

J. CANNON, Assistant Examiner

U.S. Cl. X.R.

8—17, 31, 55, 100; 260—895, 897